(12) United States Patent
Wright

(10) Patent No.: US 9,393,945 B2
(45) Date of Patent: Jul. 19, 2016

(54) CONTROL SYSTEM FOR RAIL CAR PARKING BRAKE

(71) Applicant: NEW YORK AIR BRAKE, LLC, Watertown, NY (US)

(72) Inventor: Eric C. Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 136 days.

(21) Appl. No.: 14/444,012

(22) Filed: Jul. 28, 2014

(65) Prior Publication Data

US 2016/0023645 A1 Jan. 28, 2016

(51) Int. Cl.
*B60T 15/18* (2006.01)

(52) U.S. Cl.
CPC ..................... *B60T 15/184* (2013.01)

(58) Field of Classification Search
CPC ............. B60T 15/184–15/185; B60T 15/048; B60T 15/021; B61H 11/00; B61H 11/02; B61H 13/00; B61H 13/005
See application file for complete search history.

(56) References Cited

U.S. PATENT DOCUMENTS 3,208,801 A 9/1965 McClure

FOREIGN PATENT DOCUMENTS

| DE | 102007031235 | 1/2009 |
|----|--------------|--------|
| EP | 0268183 | 5/1988 |
| EP | 0784003 | 7/1997 |
| EP | 1127770 | 8/2001 |
| EP | 1193156 | 4/2002 |
| FR | 2366967 | 5/1978 |
| GB | 1206893 | 9/1970 |
| WO | 2013181707 | 12/2013 |

OTHER PUBLICATIONS

International Search Report Form PCT/ISA/220, International Application No. PCT/US2014/048412, pp. 1-11, Dated Feb. 9, 2015.

*Primary Examiner* — Anna Momper
(74) *Attorney, Agent, or Firm* — Bond Schoeneck and King PLLC; David Nocilly

(57) ABSTRACT

A parking brake control system positioned upstream of a rail car parking brake locking mechanism that prevents the parking brake from disengaging until the braking system recharges to a sufficient point that it can be used to maintain the train on a grade. The system includes a three way valve that reduces the brake pipe pilot pressure supplied to the parking brake unlocking system until the brake pipe pressure reaches a predetermined threshold. A release delay system may be coupled to the parking brake control system to retard the rate at which the parking brakes of rail cars positioned near the head of a train are released to ensure that the parking brakes of the entire train are released at about the same time.

18 Claims, 5 Drawing Sheets

CONTROL SYSTEM FOR RAIL CAR PARKING BRAKE

BACKGROUND OF THE INVENTION

1. Field of the Invention

The present invention relates to train parking brake systems and, more particularly, to a system and method for controlling a rail car braking system.

2. Description of the Related Art

Parking brake systems for railway are well-known and generally use a mechanical source of parking brake force that is held off by air pressure. One embodiment in particular is the spring applied/air released parking brake, which uses a large spring for the parking force. The spring is normally held in the compressed state and allowed to expand to apply the parking brake. The parking brake is then released when the system is pressurized to recompress the spring.

Another conventional parking brake system is the Parkloc® system available from New York Air Brake, LLC of Watertown, N.Y., which is additionally described in U.S. Pat. Nos. 7,163,090 and 7,377,370. The Parkloc® system uses a pneumatically controlled, mechanical locking mechanism to lock the air brake cylinder in the applied, loaded state. As a result, even if the air brake cylinder subsequently leaks away due to a long parking duration, the brakes are mechanically held in the applied position. The latching mechanism in the Parkloc is piloted by brake pipe pressure and is arranged to lock when brake pipe pressure drops below 60 psi and unlock when brake pipe exceeds 65 psi. Although the actual pressures to lock and unlock can be defined by the design of the latching piston, including the piston area and spring preloads, the hysteresis, i.e., the difference between locking and unlocking pressures, is not so easily changed, as locking and unlocking are the result of pressurizing a single piston element with a fixed wetted area.

In normal operation, it is not uncommon for a train to be forced to stop on a grade. Because the AAR brake systems used on freight trains are a direct release system, recharge of the air brake system is done simultaneously with brake system release. To prevent the train from rolling away on a grade during this release and recharge process, the train crew manually sets the handbrakes on a sufficient number of the cars in the train to hold the train stationary. Once the hand brakes are set, the train air brakes are released and recharged. The hand brakes must then be manually released before the train can be moved.

While a Parkloc® parking brake system would hold a train on a grade in a parked state with the brake pipe vented, as soon as the brake pipe pressure exceeded the release pressure, e.g., 65 psi, the parking brake will release simultaneously with the air brakes. As a result, it is desired to have a parking brake system which will not release until the train brakes are substantively recharged and which can be controlled from by the driver of the locomotive without the need for someone to walk the length of the train to manually release the hand brakes that were set on a sufficient number of the cars in the train to hold the train in stationary position.

BRIEF SUMMARY OF THE INVENTION

The present invention comprises a system for retaining brakes on a grade that use a three way valve having an inlet and being movable between a first position, where said inlet is connected to a first outlet, and a second position, wherein said inlet is connected to a second outlet. A spring having a force is used to bias the valve into the second position, and a pneumatic pilot that is interconnected to both of the first and second outlets is used to bias the valve into the first position. A cracking valve having a cracking pressure is positioned between said inlet and said second outlet. As a result, the valve will move into the first position when pressure at the inlet exceeds the force of the spring and the cracking pressure of the cracking valve, and the valve will move into the second position when pressure at the inlet is below the force of the spring.

The parking brake retention system may additionally be coupled to a rate sensitive valve for delaying the release of parking brakes on the rail cars that are at the front of the train and often release first due to higher pressure and flow rates at the head of the train. A first embodiment of a rate sensitive has an inlet connected directly to a first pilot and connected to a second pilot via a choke and a reservoir. The rate sensitive valve is movable between a first position, wherein the inlet is connected to an outlet via a cracking valve having a cracking pressure, and a second position, wherein the inlet is connected directly to said outlet. In another embodiment, the rate sensitive valve has an inlet connected directly to a first pilot and connected to a second pilot via a choke and a reservoir, and the rate sensitive valve is movable between a first position, wherein the inlet is connected to an outlet via the choke, and a second position, wherein the inlet is connected directly to the outlet

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
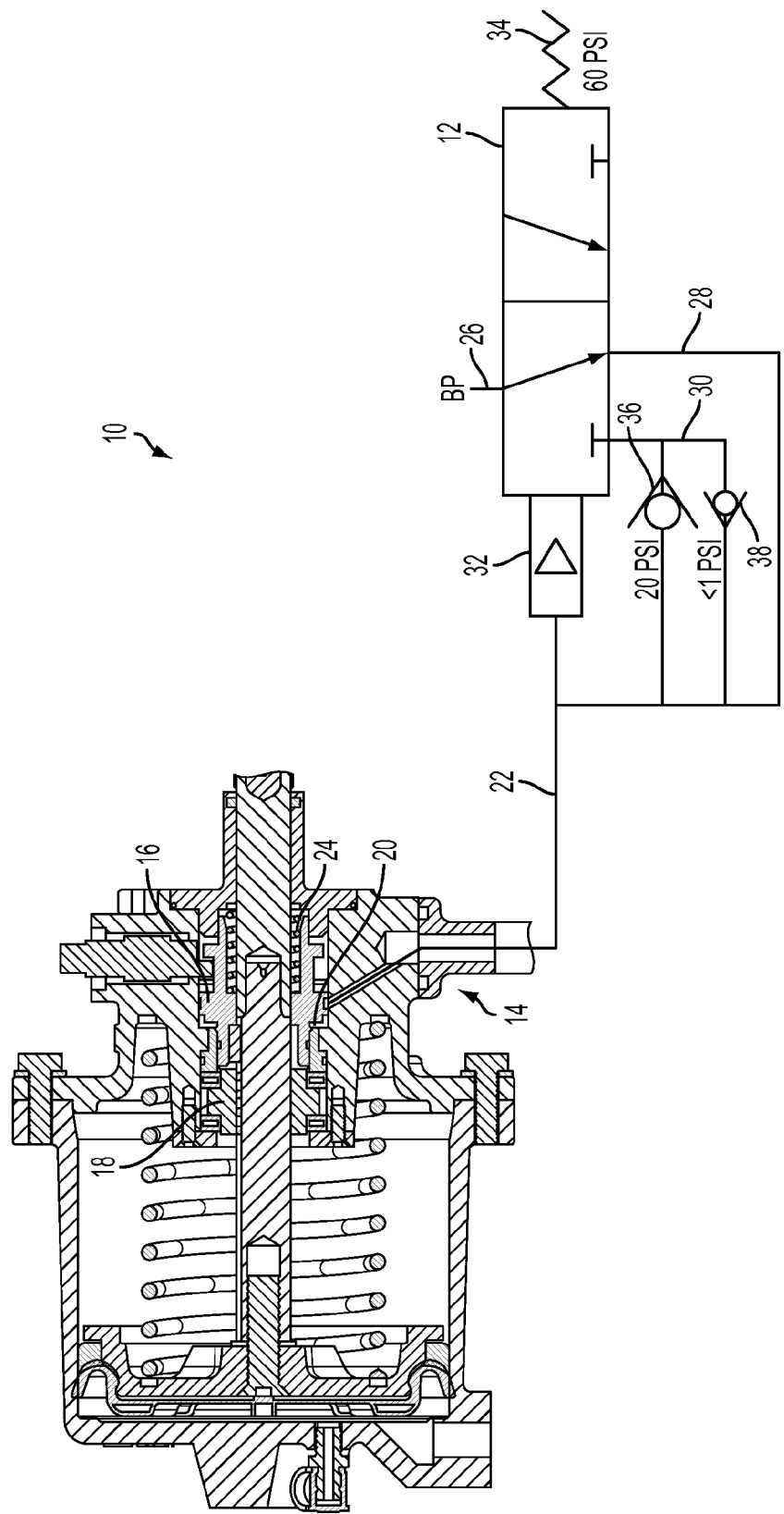
FIG. 1 is a schematic of a control system for a rail car parking brake in a first position according to the present invention.
Figure 2:
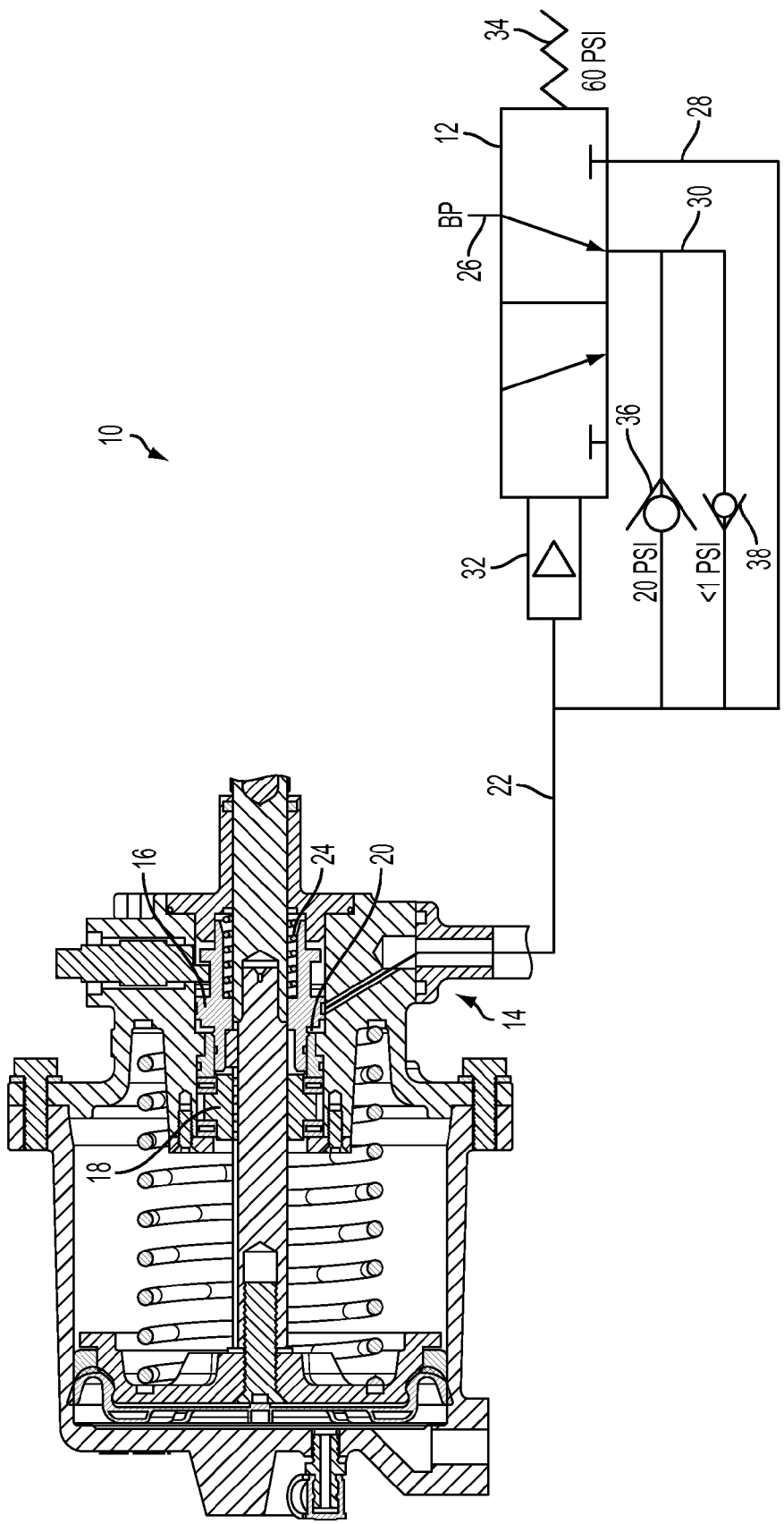
FIG. 2 is a schematic of a control system for a rail car parking brake in a second position according to the present invention.
Figure 3:
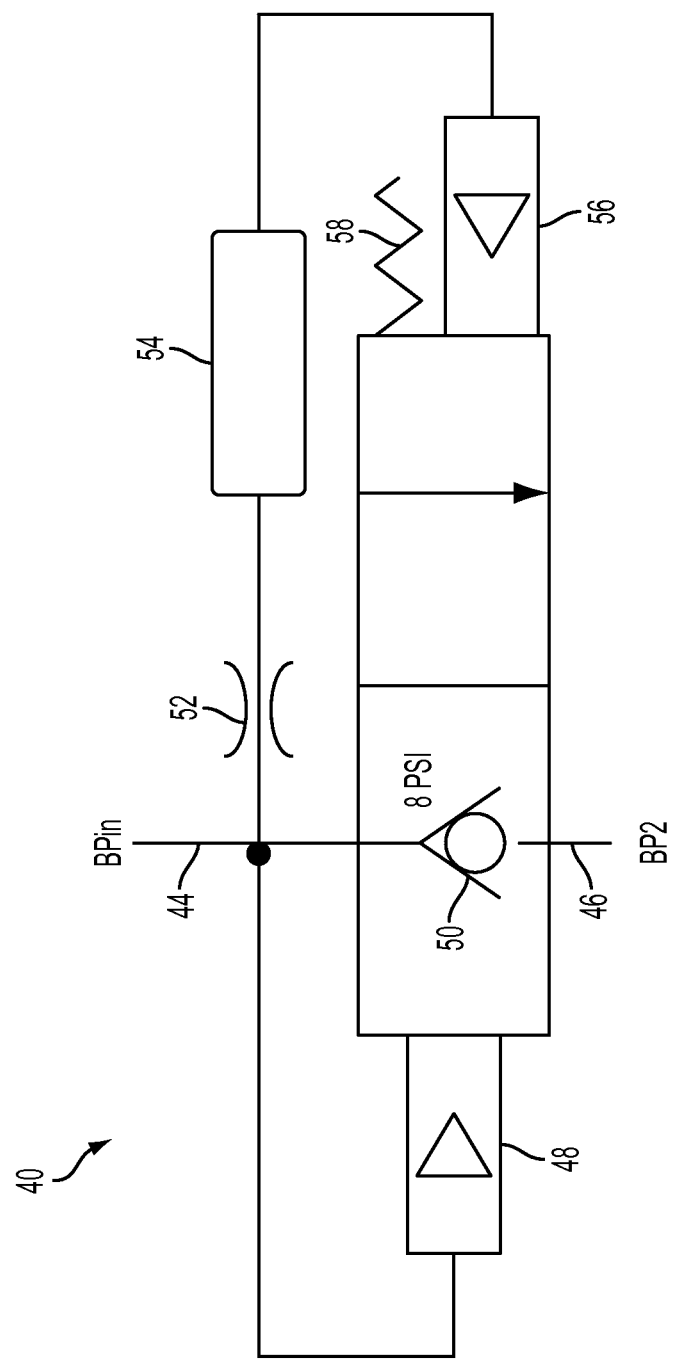
FIG. 3 is a schematic of an embodiment of a delayed release circuit for a control system of a rail car parking brake.

Referring now to the drawings, wherein like reference numerals refer to like parts throughout, there is seen in FIG. 1 a parking brake control system 10 that will actuate the parking brake of a rail car at a low pressure and release the parking brake at a higher pressure to allow the parking brake to hold the train until the air brakes are substantively recharged and it is safe to move the train. System 10 comprises a pneumatically piloted three-way valve 12 that may be interconnected to a locking mechanism 14 of a conventional Parkloc braking system, such as that seen in U.S. Pat. Nos. 7,163,090 and 7,377,370.

As further seen in FIG. 1, a Parkloc braking system includes a parking brake locking mechanism 14 includes a locking sleeve 16 that cooperates with a rotatable locking nut 18 to prevent release of a rail car braking cylinder, thus providing a parking brake system. Locking nut 18 is rotatable about a threaded portion of the brake cylinder shaft and has teeth that cooperate to lock and unlock the parking brake locking mechanism 14 by engaging with corresponding teeth positioned on locking sleeve 16, thereby prevent the release of the brake cylinder when locking nut 18 and locking sleeve 16 are engaged. Locking mechanism 14 is unlocked or released by applying fluid pressure from the brake pipe via an inlet 22 to a contact area 20 of sleeve 16, thereby driving locking sleeve 16 away from and thus out of engagement with locking nut 18 by disengaging the toothed surfaces. When brake pipe pressure is removed from contact area 20, a spring 24 returns locking sleeve 16 into engagement with locking nut 18, thus returning locking mechanism 12 into a locked position. Based on the force of spring 24, the amount of brake pressure that must be removed for the locking mechanism to engage can be controlled.

Starting from a fully charged brake pipe, to make a brake application, the brake pipe pressure is reduced and the air brake control system on a rail car pressurizes the pneumatic brake cylinder on the car by an amount proportional to the brake pipe reduction. Typically, the brake pipe release and recharge pressure is 90 psi. For a 90 psi brake pipe, a full service brake application would reduce the brake pipe pressure to approximately 65 psi. At full service, the brake pipe, auxiliary reservoir, and brake cylinder pressures are equalized to the same pressure. Further reduction of brake pipe pressure, known as an over-reduction, will not result in additional service brake. To prevent a Parkloc braking system from latching during normal service braking, the latching pressure is usually set at a value less than equalization, such as 60 psi. To latch the Parkloc braking system, the brake pipe pressure must therefore be intentionally reduced beyond full service, e.g., 65 psi, to a value less than 60 psi, so that spring 24 can move sleeve 16 into the locked position with respect to locking nut 18. Thus, when the brake pipe pressure is reduced to less than 60 psi, locking sleeve 16 of Parkloc braking system moves to the latched position under the influence of associated spring 24. Thus, the parking brake is set by reducing brake pipe pressure below full service. When the brake pipe pressure is recharged sufficiently to exceed the trigger pressure of the Parkloc braking system, locking sleeve 16 is disengaged from locking nut 18 and the parking brake is released. If the train is on a grade, however, the release of the parking brake is premature as the brake pipe pressure is not sufficiently recharged at the point when the parking brake releases to maintain the train against the grade.

In order to prevent the release of the parking brake system until the braking system is fully recharged, valve 12 is positioned upstream of inlet 22 of locking sleeve 16 to ensure that locking sleeve 16 does not disengage from locking nut 18 until the brake pipe pressure exceeds a predetermined amount as necessary to safely maintain the braking system when the train is on a grade. As a result, the Parkloc locking mechanism will not be released during a recharge until the brake pipe pressure has been sufficient recharged such that it is safe for the parking brake to be released and the train to move.

Valve 12 of system 10 is connected at an inlet port 26 to brake pipe pressure and is movable between first and second positions to selectively connect one of two outlets 28 and 30 to inlet 22 of locking sleeve 16. Valve 12 is controlled by a pneumatic pilot 32 that acts against the bias force of a spring 34. In a first position, valve 12 allows the full amount of brake pipe pressure to be directed to inlet 2 of parking brake locking mechanism 14, such as that described above with respect to a Parkloc system. As a result, the parking brake may be set in the conventional manner by decreasing brake pipe pressure below the predetermined threshold.

When the brake pipe pressure at pilot 32 of valve 12 is below the force of spring 34, i.e., the brake pipe pressure has been reduced below a normal brake application to set the parking brake, valve 12 will then move into a second position under the bias of spring 34. Spring 34 is preloaded to act against the pneumatic pilot pressure and the preload value is set to be substantively the same pressure as the latching pressure in, for example, a Parkloc braking system. It should be recognized that the preload value may be adjusted according to particular needs or for other types of parking brake systems.

In the second position, valve 12 interconnects the brake pipe pressure of pilot 26 to inlet 22 of locking sleeve 16 via a check valve 36, which reduces the pilot pressure downstream of check valve 36 by an amount equal to the check valve preload, e.g., 20 psi. As a result, neither locking sleeve 16 nor valve 12 can reset until the brake pipe pressure at pilot 26 exceeds the sum of the spring preload on valve 12 plus the in-line check valve 36 preload, e.g., 60 psi plus 20 psi for a total pressure of 80 psi. Valve 12 also includes a low-cracking pressure back flow check valve 38 positioned in parallel with offset check valve 36. Low-cracking pressure back flow check valve 38 allows the pilot pressure to vent if the brake pipe pressure is further reduced, for example when the brake pipe is vented to zero when the locomotive is separated from a cut of cars.

When the brake pipe pressure exceeds 80 psi, control valve 12 moves to back to the first, high pressure position so that the full brake pipe pressure at pilot port 26 of valve 12 is directly connected to locking sleeve 16. At 80 psi of brake pipe pressure, valve 12 will allow the train air brakes to be fully released, i.e., the parking brake is unlocked, and the braking is substantively recharged such that the brakes may be used to prevent rolling of the train if it is on a grade. As a result, system 10 allows for safe release of the parking brake even if the train is on a grade because sufficient normal braking capabilities are available to control the train at the point at which system 10 allows the parking brake to release. It should be apparent to those of skill in the art that the predetermined latching pressure and release pressure of system 10 can be defined and modified by selecting appropriate valve preloads to achieve the desired results for a particular braking system.

Figure 5:
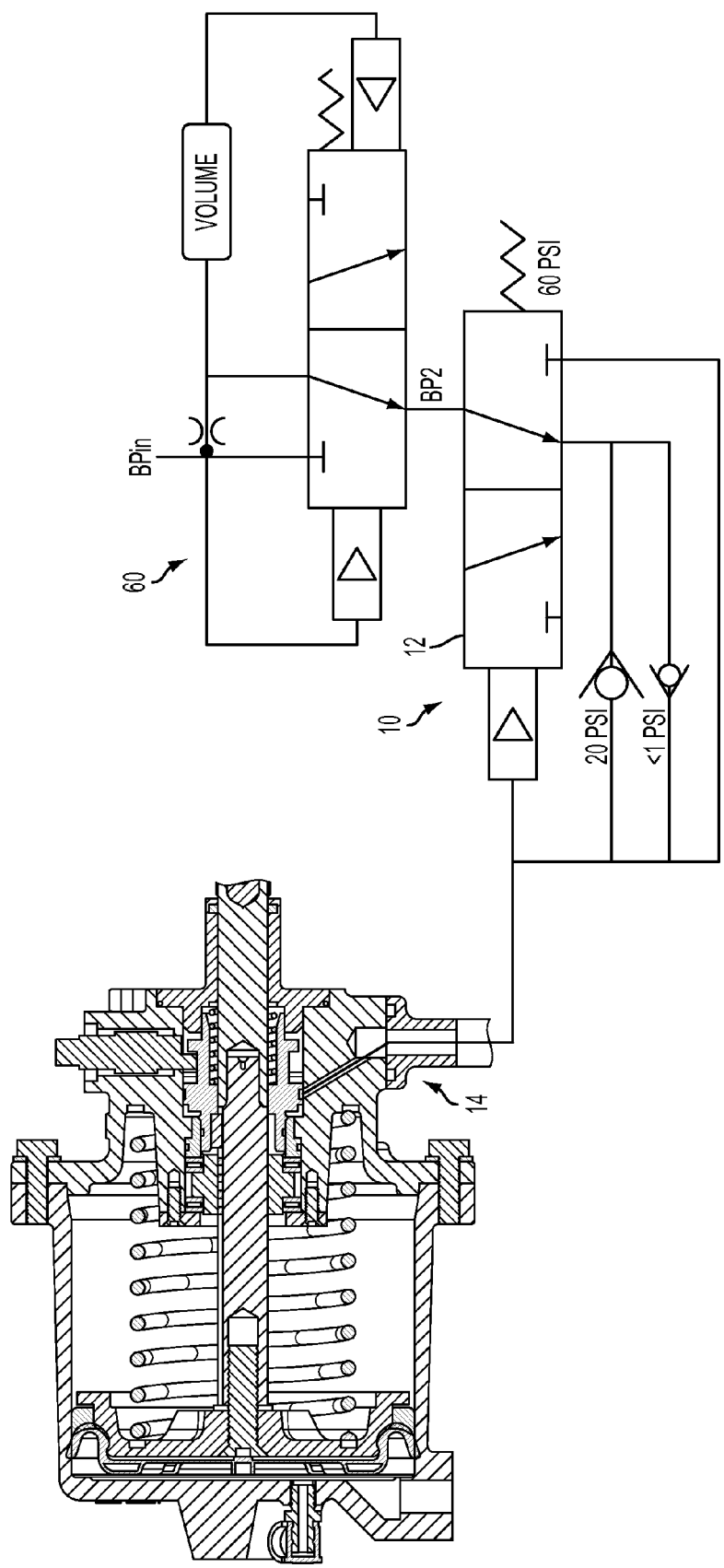
FIG. 5 is a schematic showing an embodiment of a delayed release circuit coupled to a control system for a rail car parking brake according to the present invention.

Valve 12 may optionally include a release delay system that is enabled for the cars at the front of the train so that the entire train will release the brakes at more or less the same time. For example, during a train brake recharge, the brake pipe pressure at the front of a train increases at a faster rate than the brake pipe pressure at the rear of the train due to the air flow resistance of the brake pipe itself and to the capacity of the charging of the reservoirs from brake pipe on each car of the train. The release system of the present invention accomplishes a release delay by including a valve function that is sensitive to the rate of brake pipe pressure increase and, as seen in FIG. 5, is connected upstream of pilot port 26.

A first embodiment of a release delay system comprises a rate sensitive retardation valve 40 having an inlet 44 connected to brake pipe pressure and an outlet 46 for providing a brake pipe pilot pressure (BP2) to system 10. Inlet 44 is connected directly to a first pilot 48 of retardation valve 40 and to outlet 46 via a check valve 50 (shown with an exemplary cracking pressure of 8 psi). Inlet 44 is further connected via a choke 52 to a volume 54 that is in turn connected to a second pilot 56 of valve 40 in parallel with a valve spring 58. Valve spring 58 has a low spring force, sufficient to bias valve 40 in the direct release position when the pressures in pilot 48 and pilot 56 are nominally equal. In a first position, valve 40 connects brake pipe pressure to system 10 via check valve 50 and in a second position valve 40 connects brake pipe pressure directly to system 10. When valve 40 detects a high rate of brake pipe pressure increase, indicating that the car is near the head of the train, rate sensitive retardation valve 40 moves to the pressure offset state, which includes check valve 50. The output pressure of rate sensitive retardation valve 40 in this state will be the input brake pipe pressure less the pressure preload of inline check valve 50. As a result, a valve 40 positioned at the head of the train will not provide sufficient brake pipe pressure to enable valve 12 to reset until the brake pipe pressure in the head of the train is equal to the control valve release pressure, e.g., 80 psi, plus the cracking pressure of check valve 50 of rate sensitive valve 40, e.g., 8 psi, or 88 psi in total until the pressure in volume 54 substantively equals the brake pipe pressure acting on pilot 48, at which time valve 40 moves to the direct release position under the influence of spring 58. The time of the delay may be determined or controlled by the relative size of choke 52 and the volume of reservoir 54. This embodiment recognizes that during recharge of the brake pipe pressure, the pressure at the head of the train is always higher than the pressure at the rear of the train due to pipe friction and air consumption by control valves along the way.

Figure 4:
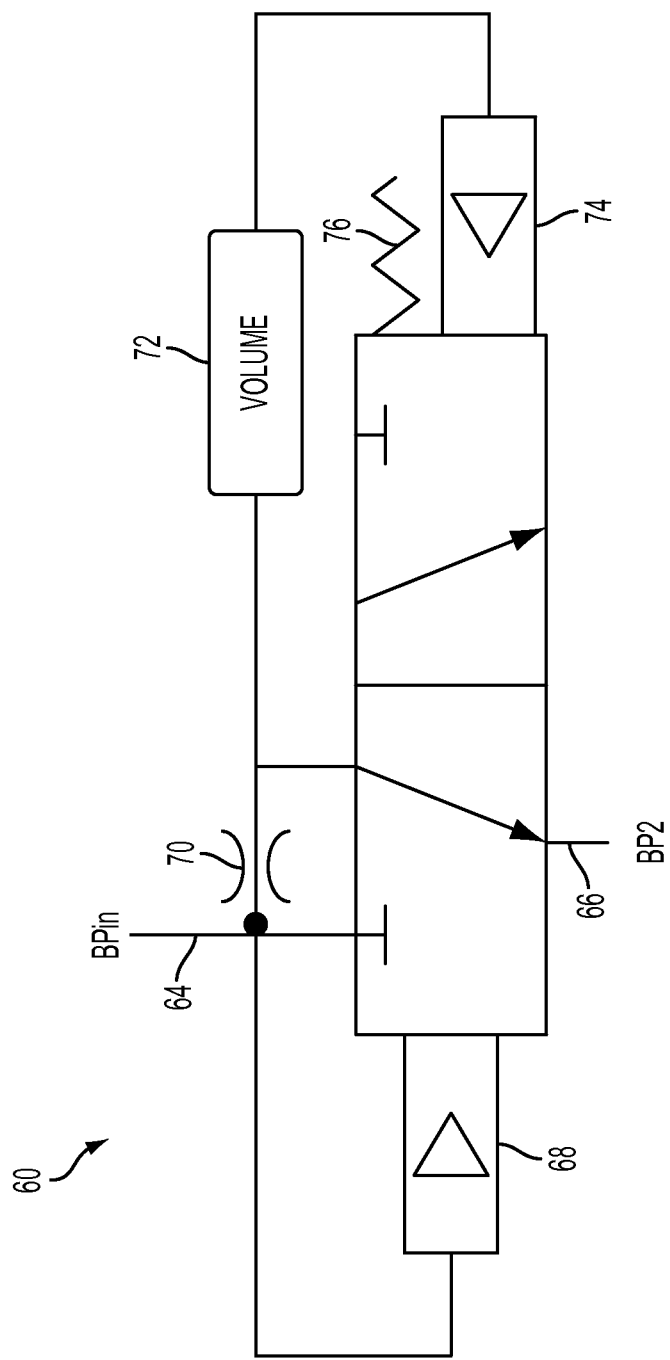
FIG. 4 is a schematic of another embodiment of a delayed release circuit for a control system of a rail car parking brake.

Referring to FIG. 4, a second embodiment of a release delay system comprises a rate sensitive retardation valve 60 having an inlet 64 connected to brake pipe pressure and an outlet 66 for providing a brake pipe pilot pressure (BP2) to system 10. Inlet 64 is connected directly to a first pilot 68 of retardation valve 60 and to outlet 66 via a choke 70. Inlet 64 is further connected to a volume 72 that is in turn connected to a second pilot 74 of valve 60 that is in parallel with a valve spring 76. Valve spring 76 has a low spring force, sufficient to bias valve 60 in the direct release position when the pressures in pilot 68 and pilot 74 are nominally equal. In a first position, valve 60 connects brake pipe pressure to system 10 via choke 70 and, in a second position, valve 60 connects brake pipe pressure directly to system 10. When a high rate of brake pipe pressure increase is detected, indicating that valve 60 is positioned in a car is near the head of the train, the brake pipe pilot pressure (BP2) to release control valve 12 is delayed by the pneumatic circuit consisting of choke 70 and a reservoir 72. The time of the delay may be determined or controlled by the relative size of choke 70 and the volume of reservoir 72. When rate sensitive retardation valve 60 is in the retardation state, the output (BP2) is connected to timing reservoir 72. In this way, the output pressure, BP2, lags the actual input brake pipe pressure at that car location and thus further delays the release of the parking brake.

In both embodiments of the release circuit, control valve 12 is in direct communication with brake pipe pressure for cars in the rear of the train where the rate of brake pipe pressure increase is lower. In both cases, control valve 12 will release when the pilot pressure exceeds the specified release pressure, e.g., 80 psi, and will thus not be delayed by any release delay system.

Control valve 12, as well as any brake pipe rate sensitive release delay circuit 40 or 60, can optionally be packaged in the non-pressure region of a brake cylinder having a Parkloc module, or it may be realized as a separate valve module that is piped in-line with inlet 22 that provides the brake pipe connection to the Parkloc module. Although system 10 of the present invention was described in combination with a Parkloc® parking brake system, system 10 may be used to control a spring-applied, air released parking brake actuators that are released in response to a predetermined threshold brake pipe pressure.

What is claimed is:

1. A system for retaining a train parking brake on a grade, comprising:
    a three way valve having an inlet and being moveable between a first position, where said inlet is connected to a first outlet, and a second position, wherein said inlet is connected to a second outlet;
    a spring having a force for biasing said three way valve into the second position;
    a pneumatic pilot interconnected to both of said first and second outlets for biasing said three way valve into the first position;
    a cracking valve positioned between said pneumatic pilot and said second outlet and having a cracking pressure;
    wherein said three way valve will move into said first position when pressure at said pneumatic pilot exceeds the force of said spring and the cracking pressure of said cracking valve, and said three way valve will move into said second position when pressure at said pneumatic pilot is below the force of said spring.

2. The system of claim 1, wherein said inlet is connected to a source of brake pipe pressure.

3. The system of claim 2, wherein the force of said spring is set to be overcome by a predetermined amount of force.

4. The system of claim 2, wherein the force of said spring is set to be overcome by 60 psi of brake pipe pressure.

5. The system of claim 4, wherein the cracking pressure of said cracking valve is set to 8 psi.

6. The system of claim 5, wherein said first and second outlets are interconnected to a train parking brake.

7. The system of claim 6, wherein said train parking brake comprising a locking nut and a locking sleeve having a contact area.

8. The system of claim 7, wherein said first and second outlets are in communication with said contact area.

9. The system of claim 2, further comprising a back flow check valve positioned in parallel with said cracking valve.

10. The system of claim 1, further comprising a release delay system.

11. The system of claim 10, wherein said release delay system comprises:
    a rate sensitive valve having an inlet connected directly to a first pilot and connected to a second pilot via a choke and a reservoir, said rate sensitive valve being moveable between a first position, wherein said inlet is connected to an outlet via a second cracking valve having a second cracking pressure, and a second position, wherein said inlet is connected directly to said outlet; and
    a second spring positioned in parallel with said second pilot and having a second force for biasing said rate sensitive valve into said first position.

12. The system of claim 11, wherein the second cracking pressure is 8 psi.

13. The system of claim 12, wherein the second force is sufficient to bias said rate sensitive valve into the second position when the pressure in said first and second pilots are nominally equal.

14. The system of claim 10, wherein said release delay system comprises:
    a rate sensitive valve having an inlet connected directly to a first pilot and connected to a second pilot via a choke and a reservoir, said rate sensitive valve being moveable between a first position, wherein said inlet is connected to an outlet via said choke, and a second position, wherein said inlet is connected directly to said outlet; and a second spring parallel with said second pilot and having a second force for biasing said rate sensitive valve into said first position.

15. The system of claim 14, wherein the second force is sufficient to bias said rate sensitive valve into the second position when the pressure in said first and second pilots are nominally equal.

16. The system of claim 1, further comprising a parking brake locking mechanism interconnected to said three way valve and to a brake cylinder having a non-pressure head to prevent said brake cylinder from releasing until brake pipe pressure exceeds a predetermined threshold.

17. The system of claim 16, wherein said three way valve and said parking brake locking mechanism are contained within a single housing.

18. The system of claim 16, wherein said single housing is positioned within the non-pressure head of said brake cylinder.

* * * * *